United States Patent
Kimura

(10) Patent No.: US 10,203,914 B2
(45) Date of Patent: Feb. 12, 2019

(54) PRINTING APPARATUS OPERABLE IN SERVICE MODE FOR WORK PERFORMED BY SERVICE ENGINEER

(71) Applicant: CANON KABUSHIKI KAISHA, Tokyo (JP)

(72) Inventor: Tomohiro Kimura, Matsudo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/614,417

(22) Filed: Jun. 5, 2017

(65) Prior Publication Data
US 2017/0357202 A1   Dec. 14, 2017

(30) Foreign Application Priority Data

Jun. 10, 2016   (JP) .................. 2016-116116

(51) Int. Cl.
*G06F 3/12*    (2006.01)
*G03G 15/00*   (2006.01)
*H04N 1/00*    (2006.01)
*H04L 29/06*   (2006.01)

(52) U.S. Cl.
CPC ........ *G06F 3/1204* (2013.01); *G03G 15/5079* (2013.01); *G06F 3/1203* (2013.01); *G06F 3/1229* (2013.01); *G06F 3/1267* (2013.01); *G06F 3/1285* (2013.01); *H04L 63/06* (2013.01); *H04N 1/00344* (2013.01)

(58) Field of Classification Search
CPC .... G06F 3/1203; G06F 3/1204; G06F 3/1224; G06F 3/1229; G06F 3/123; G06F 3/1285; G06F 3/1286; G06F 3/1292; G03G 15/5079
See application file for complete search history.

(56) References Cited

U.S. PATENT DOCUMENTS

| | | | | |
|---|---|---|---|---|
| 6,327,446 | B1* | 12/2001 | Suzuki | G03G 15/5075 399/11 |
| 7,856,089 | B2* | 12/2010 | Hanna | H04N 1/00 379/100.01 |
| 2009/0146980 | A1* | 6/2009 | Nishikawa | G06F 8/60 345/205 |
| 2010/0296123 | A1* | 11/2010 | Maruyama | G06F 3/121 358/1.15 |
| 2012/0047439 | A1* | 2/2012 | Harlan | G06F 11/3013 715/736 |
| 2013/0084971 | A1* | 4/2013 | Frady | G07F 17/3223 463/29 |

(Continued)

FOREIGN PATENT DOCUMENTS

JP    2016-048434 A    4/2016

OTHER PUBLICATIONS

"SPDS v2.0". 2013. Hewlett-Packard Development Company, L.P. (Year: 2013).*

*Primary Examiner* — Thomas J Cleary
(74) *Attorney, Agent, or Firm* — Canon USA Inc., IP Division

(57) ABSTRACT

A printing apparatus operating in a service mode is reactivated when the printing apparatus receives a reactivation instruction from an external device connected to the printing apparatus by a direct wireless communication function. The reactivated printing apparatus starts an operation in the service mode instead of a normal operation mode.

16 Claims, 6 Drawing Sheets

(56) References Cited

U.S. PATENT DOCUMENTS

| | | | |
|---|---|---|---|
| 2013/0148149 A1* | 6/2013 | Park ...................... | G06F 3/1296 |
| | | | 358/1.13 |
| 2013/0260683 A1* | 10/2013 | Suzuki ................. | H04W 76/10 |
| | | | 455/41.1 |
| 2015/0347066 A1* | 12/2015 | Moritomo ............. | H04W 8/005 |
| | | | 358/1.15 |
| 2017/0006694 A1* | 1/2017 | Davis ................. | H05B 37/0263 |
| 2017/0094451 A1* | 3/2017 | Terashita ............... | H04W 4/008 |
| 2017/0237870 A1* | 8/2017 | Kojima ............. | H04N 1/00307 |
| | | | 358/1.15 |
| 2017/0264697 A1* | 9/2017 | Qi ........................... | H04L 67/16 |
| 2017/0280502 A1* | 9/2017 | Mihira ................. | H04W 76/36 |
| 2017/0289743 A1* | 10/2017 | Asakura ............... | H04W 76/14 |
| 2017/0295488 A1* | 10/2017 | Langhammer ........ | H04W 12/04 |
| 2017/0339735 A1* | 11/2017 | Kawaguchi ......... | H04W 76/023 |

* cited by examiner

300 SERVICE SCREEN

310 SERVICE SCREEN

320 SERVICE SCREEN

PRINTING APPARATUS OPERABLE IN SERVICE MODE FOR WORK PERFORMED BY SERVICE ENGINEER

BACKGROUND

Field

The present disclosure relates to a printing apparatus operable in a service mode for work performed by a service engineer.

Description of the Related Art

Information processing apparatuses such as printing apparatuses can be used in such a manner that maintenance work is periodically performed by a service engineer. Many of the information processing apparatuses include wireless communication functions. One example of a wireless communication function is a direct wireless communication function that causes the information processing apparatus to operate as an access point to directly and wirelessly connect the information processing apparatus to an external device, such as the mobile terminal of a service engineer. The service engineer operates the mobile terminal to perform maintenance work, such as a setting change of the information processing apparatus or collecting logs of the information processing apparatus into the mobile terminal. Japanese Patent Application Laid-Open No. 2016-048434 discusses a configuration in which a mobile terminal of a service engineer wirelessly acquires error information of a printing apparatus from the printing apparatus and transmits the acquired error information to a maintenance server.

In general, when a service engineer performs maintenance work on an information processing apparatus, the information processing apparatus needs to operate in a service mode that is an operational mode different from a normal operation mode, i.e., a mode used when a general user uses the information processing apparatus. Accordingly, the service engineer needs to perform a special operation, e.g., service engineers need to activate the information processing apparatus while pressing a predetermined button, to cause the information processing apparatus to operate in the service mode.

When the mobile terminal is connected directly and wirelessly to the information processing apparatus, a reactivation instruction can be transmitted from the mobile terminal to the information processing apparatus along with progress of the maintenance work. The information processing apparatus can be reactivated according to the reactivation instruction. In such a case, however, the service engineer does not activate the information processing apparatus while performing the special operation. Thus, the information processing apparatus does not operate in the service mode. When the information processing apparatus is to operate in the service mode, the service engineer needs to perform the special operation anew to activate the information processing apparatus. Consequently, such an operation becomes a cumbersome task from a standpoint of the service engineer.

SUMMARY

According to an aspect of the present disclosure, a printing apparatus operable in a normal operation mode and a service mode for work performed by a service engineer includes a wireless communication unit configured to communicate with an external device by using a direct wireless communication function, and a control unit configured to reactivate the printing apparatus when the printing apparatus operates in the service mode and receives a reactivation instruction from the external device connected to the printing apparatus by the direct wireless communication function, wherein the printing apparatus reactivated by the control unit starts an operation in the service mode instead of the normal operation mode.

Further features will become apparent from the following description of exemplary embodiments with reference to the attached drawings.

DESCRIPTION OF THE EMBODIMENTS

Hereinafter, exemplary embodiments are described with reference to the drawings. The following exemplary embodiments are not intended to limit the scope of the claims, and not all of the combinations of the aspects described according to the following embodiments are necessarily required with respect to the issues solved by the following embodiments.

Figure 1:
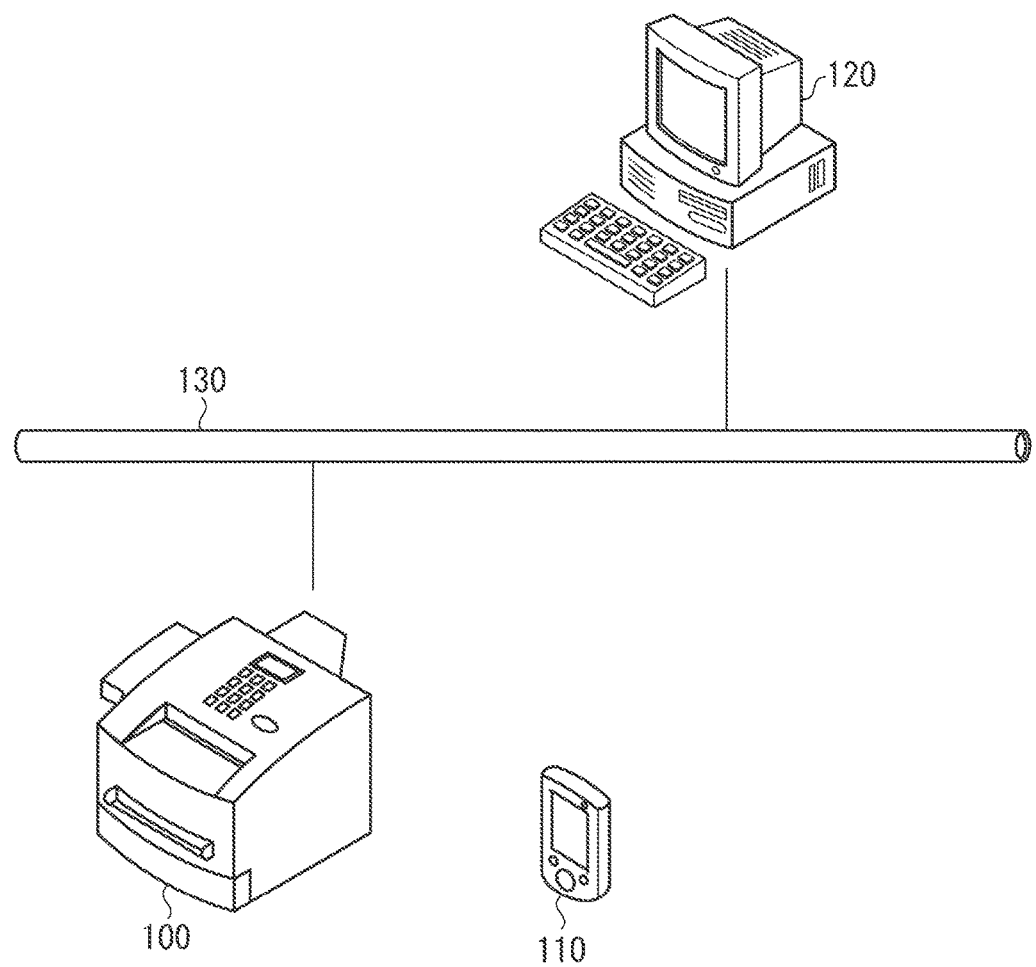
FIG. 1 is a diagram illustrating a configuration of a system

A first exemplary embodiment is hereinafter described. FIG. 1 illustrates an overview of a system. A printing apparatus 100 is connected to a network 130 to communicate with other devices (e.g., a personal computer (PC) 120) on the network 130. The printing apparatus 100 receives print data from an external device, such as the PC 120, and executes print processing based on the received print data. A mobile terminal 110 is a terminal possessed by a service engineer (also referred to as a service person). The printing apparatus 100 includes a direct wireless communication function. The printing apparatus 100 and the mobile terminal 110 are directly and wirelessly connected by the direct wireless communication function. The service engineer operates the mobile terminal 110 to perform maintenance work, such as changing a setting of the printing apparatus 100 and collecting logs of the printing apparatus 100 into the mobile terminal 110.

Figure 2:
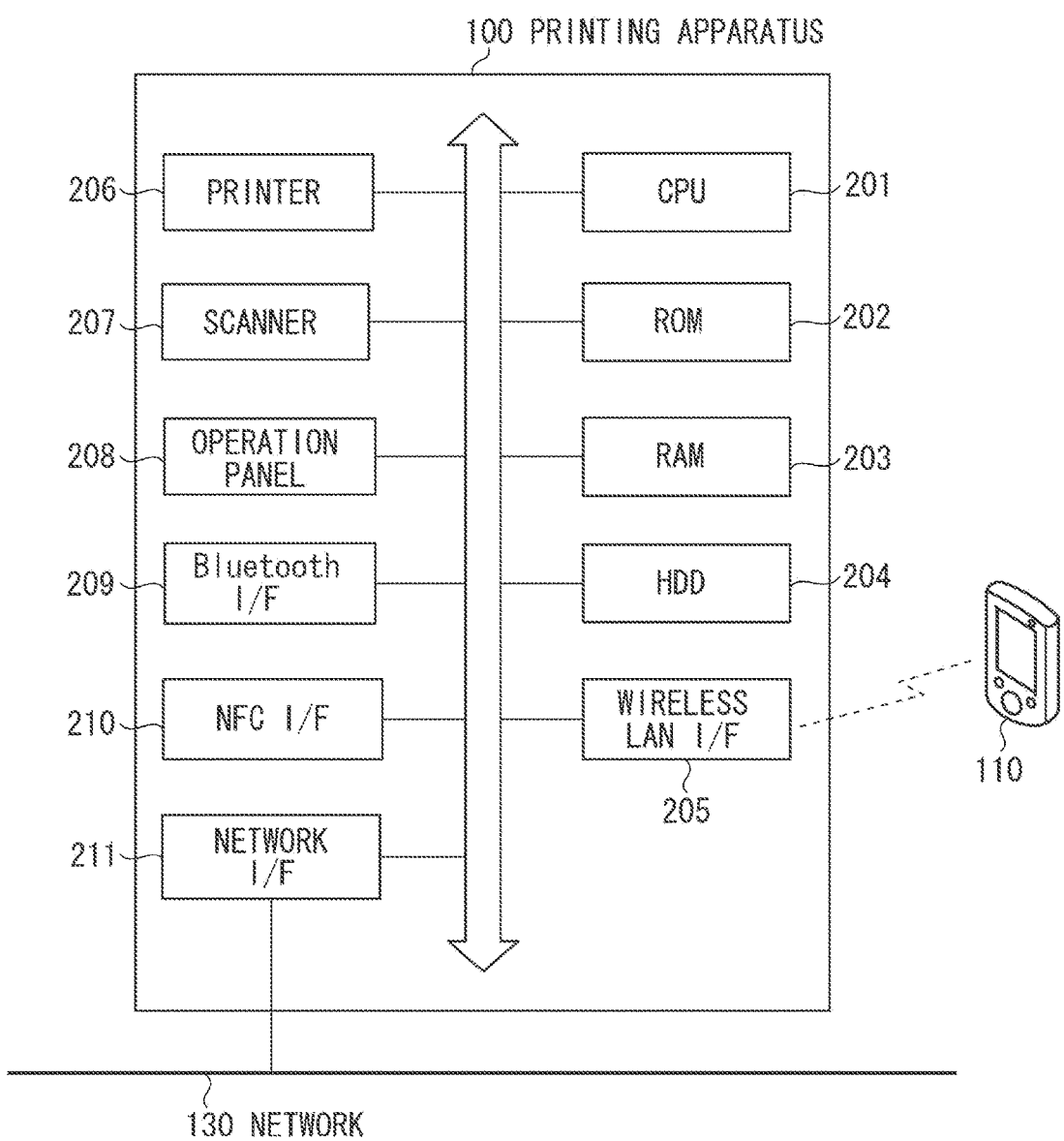
FIG. 2 is a diagram illustrating a hardware configuration of a printing apparatus.

Next, a hardware configuration of the printing apparatus 100 is described with reference to FIG. 2. The printing apparatus 100 is one example of an information processing apparatus operable in a service mode.

A central processing unit (CPU) 201 reads a control program stored in a read only memory (ROM) 202 to execute various processing so that operations of the printing apparatus 100 are controlled. The ROM 202 stores the control program. A random access memory (RAM) 203 is used as a main memory and a temporary storage area such as a work area. A hard disk drive (HDD) 204 is a nonvolatile storage medium that stores various data.

A printer 206 executes print processing on a sheet based on print data received by a network interface (I/F) 211 or a wireless local area network (LAN) I/F 205. A scanner 207 reads a document placed by a user to generate a document image. The document image generated by the scanner 207 is printed by the printer 206 (copy processing), or stored in the HDD 204.

An operation panel 208 includes a keyboard and a liquid crystal display including a touch panel function. The operation panel 208 displays various operation screens. The user can input an instruction and information into the printing apparatus 100 via the operation panel 208.

The wireless LAN I/F 205 executes wireless LAN communication according to, for example, Institute of Electrical and Electronics Engineers (IEEE) 802.11a, 802.11b, 802.11g, 802.11n, and 802.11ac. The wireless LAN I/F 205 includes a software access point function (hereinafter referred to as soft AP). The soft AP wirelessly and directly connects the printing apparatus 100 to an external device, such as the mobile terminal 110, when the printing apparatus 100 operates as an access point. The soft AP is one example of a direct wireless communication function for directly and wirelessly connecting the printing apparatus 100 to the mobile terminal 110. Wireless fidelity direct (Wi-Fi Direct®) can be used instead of the soft AP.

A Bluetooth® I/F 209 performs wireless communication according to a Bluetooth® standard. The Bluetooth® I/F 209 supports Bluetooth® Low Energy and broadcasts a Bluetooth® Low Energy advertise packet at a predetermined cycle.

A near field communication (NFC) I/F 210 performs proximity wireless communication according to a NFC standard. The NFC I/F 210 includes a memory (not illustrated) in which predetermined information (e.g., an Internet Protocol (IP) address of the printing apparatus 100) is stored. A mobile terminal that operates in an NFC reader/writer mode can read the information stored in the memory of the NFC I/F 210.

Next, maintenance work performed by the service engineer for the printing apparatus 100 is described. In particular, a procedure for connecting the mobile terminal 110 of the service engineer to the printing apparatus 100 is described.

First, the service engineer causes the printing apparatus 100 to operate in a service mode. The term "service mode" used herein represents an operation mode that is provided so that maintenance work is performed by the service engineer. The service mode is an operational mode different from a normal operational mode that is used when a general user uses the printing apparatus 100. The service engineer performs a special operation, e.g., the service engineer activates the printing apparatus 100 while pressing a predetermined button, on the printing apparatus 100 to cause the printing apparatus 100 to operate in the service mode. If the service engineer activates the printing apparatus 100 without the special operation, the printing apparatus 100 operates in the normal activation mode.

Figure 3A:
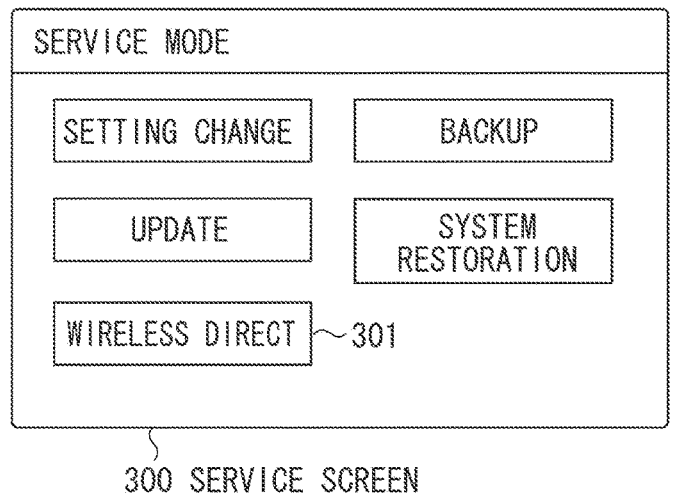
FIGS. 3A, 3B, and 3C are diagrams each illustrating a screen displayed by an information processing apparatus in a service mode.

When the printing apparatus 100 starts an operation in the service mode, the operation panel 208 displays a service screen 300 illustrated in FIG. 3A. On the service screen 300, a plurality of icons relating to maintenance work to be performed by the service engineer is displayed. The service engineer touches a desired icon to make a selection. When the service engineer wirelessly connects the mobile terminal 110 to the printing apparatus 100, the service engineer touches an icon 301 to make a selection.

Figure 3B:
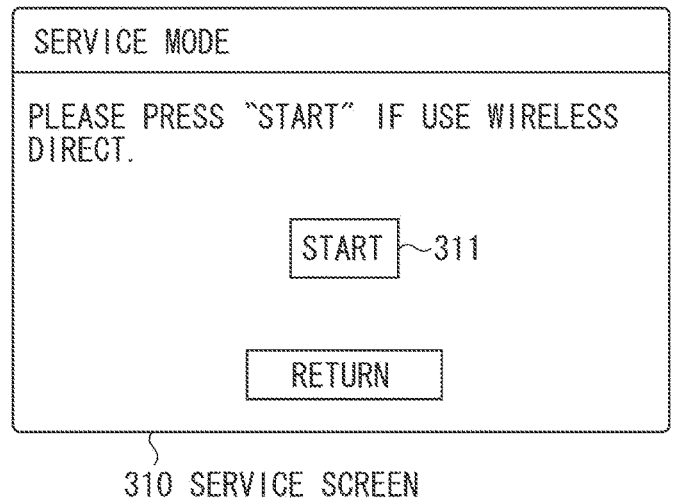

When the icon 301 is pressed by the service engineer, the operation panel 208 of the printing apparatus 100 displays a service screen 310 illustrated in FIG. 3B. On the service screen 310, a start icon 311 is displayed. The start icon 311 is used to instruct the printing apparatus 100 to activate the soft AP.

Figure 3C:
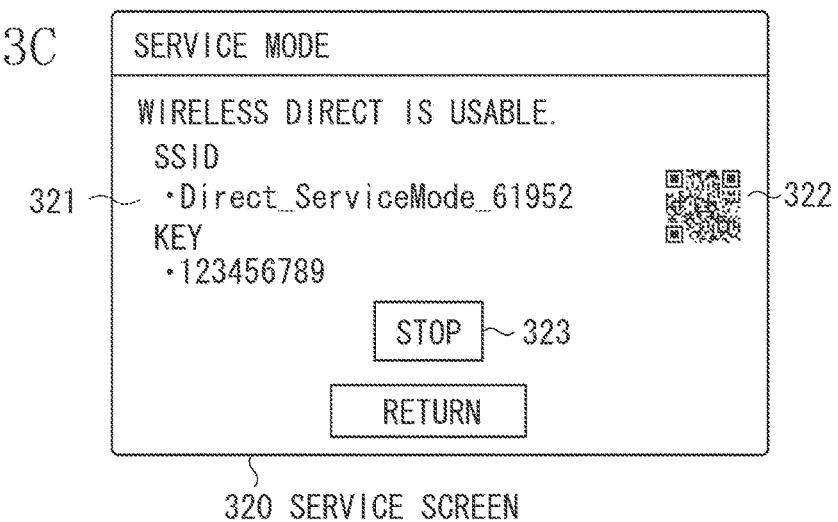

When the service engineer touches the start icon 311 to make a selection, the printing apparatus 100 activates the soft AP. When the soft AP is activated, the printing apparatus 100 generates a service set identifier (SSID) and an authentication key, e.g., a wired equivalent privacy (WEP) key, and displays the SSID and the authentication key on a service screen 320 illustrated in FIG. 3C.

The SSID and the authentication key generated by the printing apparatus 100 are displayed in an area 321 on the service screen 320. In the present exemplary embodiment, the SSID is generated in a format, "Direct_ServiceMode_XXXXX (X is a random alphanumeric character)", whereas the authentication key is generated in a format having 9-digit random alphanumeric characters. The service engineer selects an SSID which is displayed in the area 321 in the mobile terminal 110, and then inputs the authentication key displayed in the area 321 into the mobile terminal 110. Thus, the mobile terminal 110 and the printing apparatus 100 are directly and wirelessly connected.

A code 322 on the service screen 320 is a QR Code® indicating the SSID and the authentication key generated by the printing apparatus 100 and an IP address of the printing apparatus 100. The service engineer reads the code 322 by using a camera function of the mobile terminal 110, thereby directly and wirelessly connecting the mobile terminal 110 to the printing apparatus 100. In the present exemplary embodiment, the code 322 is used. However, the exemplary embodiment is not limited thereto. The Bluetooth® I/F 209 or the NFC I/F 210 can be used to provide the SSID and the authentication key generated by the printing apparatus 100 to the mobile terminal 110.

A stop icon 323 on the service screen 320 is used by the service engineer to instruct the printing apparatus 100 to stop the operation of the soft AP. When the maintenance work is finished, the service engineer selects the stop icon 323. In addition, the printing apparatus 100 finishes the operation of the soft AP if a predetermined time, e.g., 30 minutes, has elapsed without performing maintenance work to be instructed by the mobile terminal 110 or user operation with respect to the printing apparatus 100.

Figure 4:
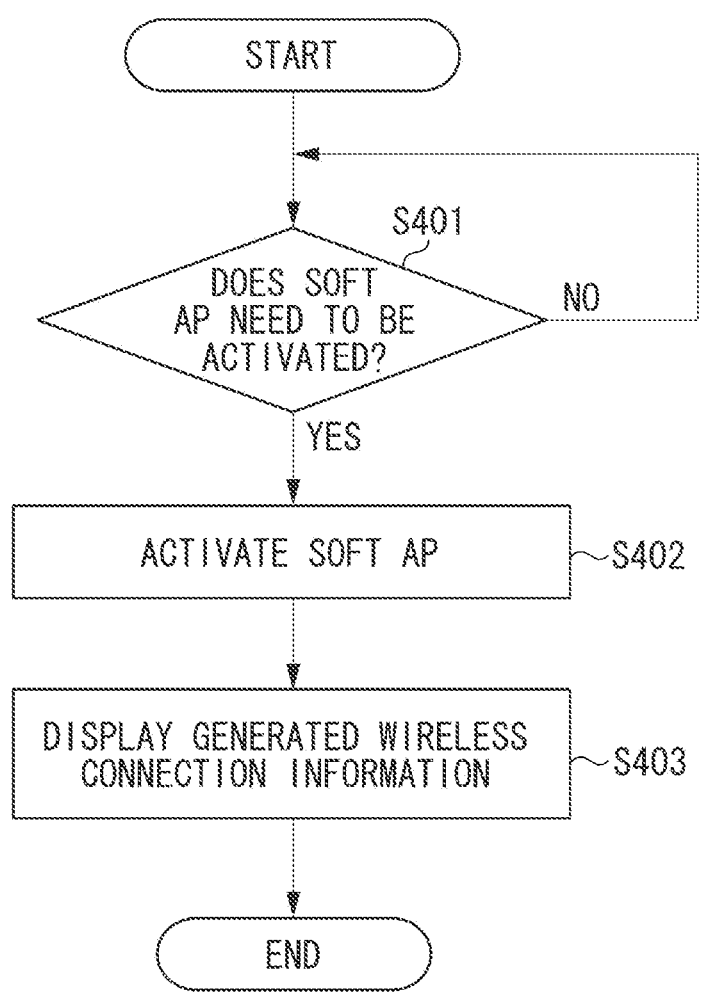
FIG. 4 is a flowchart illustrating processing executed by the printing apparatus.

Next, processing performed when the printing apparatus 100 operating in the service mode activates the soft AP is described with reference to a flowchart illustrated in FIG. 4. Each of steps in the flowchart illustrated in FIG. 4 is executed by the CPU 201. The CPU 201 loads a control program stored in a memory, such as the ROM 202, to the RAM 203, and executes the program to perform each step. Alternatively, the printing apparatus 100 can be configured such that at least one portion of the steps in the flowchart illustrated in FIG. 4 can be executed by the CPU 201, and the rest of the steps can be executed by another CPU (not illustrated) different from the CPU 201.

In step S401, the CPU 201 determines whether the soft AP needs to be activated. If the CPU 201 detects that the user has selected (touched) the start icon 311 on the service screen 310, the CPU 201 determines that the soft AP is to be activated (YES in step S401). Then, the operation proceeds to step S402. If the CPU 201 determines that the user has not selected (touched) the start icon 311 on the service screen 310 (NO in step S401), the CPU 201 waits until the user selects the start icon 311.

In step S402, the CPU 201 controls the wireless LAN I/F 205 to activate the soft AP. The CPU 201 generates wireless connection information to be used by the soft AP. The wireless connection information includes an SSID and an authentication key. In the present exemplary embodiment, the SSID is generated in a format, "Direct_ServiceMode_XXXXX (X is a random alphanumeric character)". The authentication key is generated in a format having 9-digit random alphanumeric characters. The printing apparatus 100 appears as an access point to a terminal near the printing apparatus 100 with the soft AP activated.

Even when the printing apparatus 100 is in a normal operation mode instead of the service mode, a general user can use the soft AP. When the soft AP is used in the normal operation mode, either a one-time setting or a fixed setting is made as a device setting for the printing apparatus 100. In the one-time setting, random wireless connection information is generated each time the soft AP is activated. In the fixed setting, the same wireless connection information is used every time the soft AP is used. When the soft AP is activated in the service mode, the CPU 201 generates wireless connection information in the format described in step S402. Herein, the CPU 201 generates the wireless connection information when either the one-time setting or the fixed setting has been made for the printing apparatus 100 in the normal operation mode.

Next, a description is given of step S403. In step S403, the CPU 201 controls the operation panel 208 to display the wireless connection information generated in step S402. Herein, the operation panel 208 displays the service screen 320 illustrated in FIG. 3C.

The service engineer checks the service screen 302 displayed on the operation panel 208. The service engineer uses the wireless connection information displayed on the service screen 320 to wirelessly connect the mobile terminal 110 to the printing apparatus 100. Then, the service engineer operates the mobile terminal 110 to perform maintenance work, such as a change in a setting of the printing apparatus 100 and collection of logs of the printing apparatus 100 into the mobile terminal 110.

In some cases, reactivation of the printing apparatus 100 can become necessary while the maintenance work is carried out. For example, in a case where a setting having a higher influence, such as a network setting, is changed, reactivation of the printing apparatus 100 is necessary to enable the change in the setting. In the present exemplary embodiment, a reactivation instruction can be transmitted to the printing apparatus 100 from the mobile terminal 110 directly and wirelessly connected to the printing apparatus 100. The printing apparatus 100 reactivated based on the reactivation instruction operates in the service mode instead of the normal operation mode. The processing relating to the reactivation of the printing apparatus 100 is described with reference to flowcharts illustrated in FIGS. 5 and 6.

Figure 5:
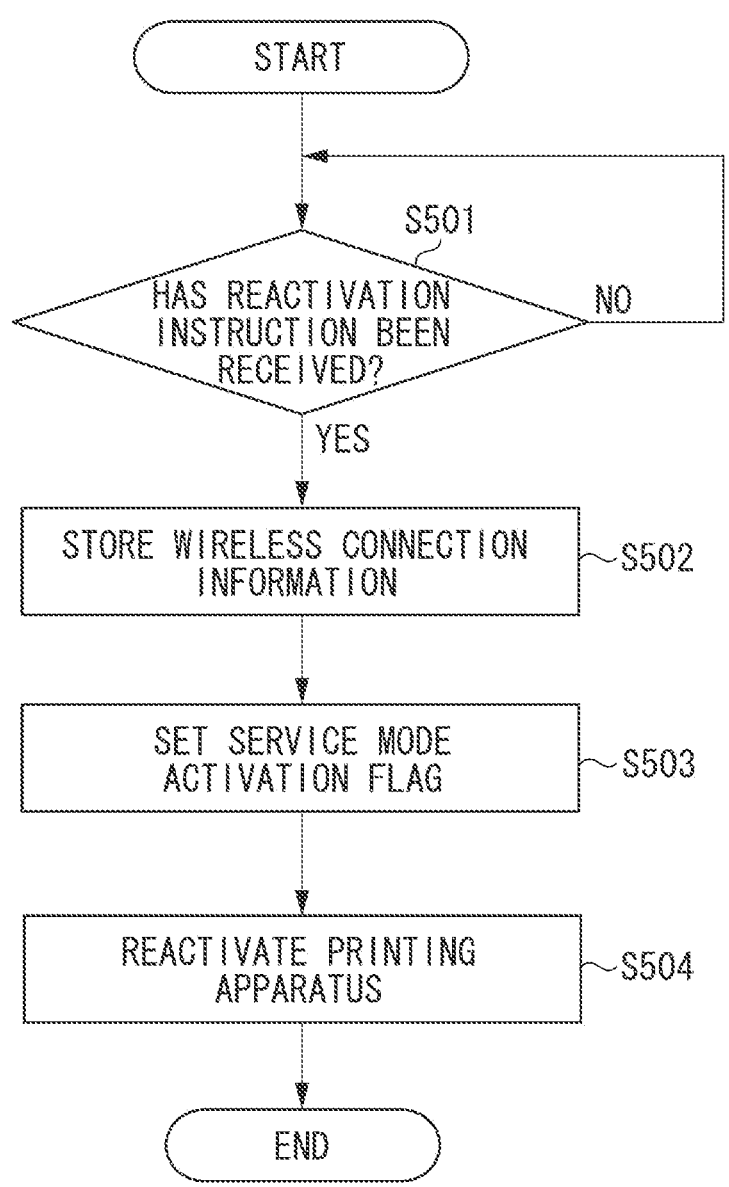
FIG. 5 is a flowchart illustrating processing executed by the printing apparatus.

Each of steps in the flowchart illustrated in FIG. 5 is executed by the CPU 201. The CPU 201 loads a control program stored in a memory, such as the ROM 202, to the RAM 203, and executes the program for each step. Alternatively, the printing apparatus 100 can be configured such that at least one portion of the steps in the flowchart illustrated in FIG. 5 is executed by the CPU 201, and the rest of the steps is executed by another CPU (not illustrated) different from the CPU 201.

In step S501, the CPU 201 determines whether a reactivation instruction has been received from an external device (the mobile terminal 110) directly and wirelessly connected to the printing apparatus 100. If the CPU 201 determines that the reactivation instruction has been received by the wireless LAN I/F 205 (YES in step S501), the operation proceeds to step S502. If the CPU 201 determines that the reactivation instruction has not been received (NO in step S501), the CPU 201 waits until the reactivation instruction is received.

Subsequently, in step S502, the CPU 201 stores the wireless connection information used by the soft AP, i.e., the wireless connection information generated in step S402, in the HDD 204. The wireless connection information stored in step S502 is deleted when the printing apparatus 100 finishes the operation of the soft AP.

Subsequently, in step S503, the CPU 201 sets a service mode activation flag. The service mode activation flag is information used for activation of the printing apparatus 100 in the service mode instead of the normal operation mode next time. The service mode activation flag is written in a register that is referred to when the printing apparatus 100 is activated.

In step S504, the CPU 201 reactivates the printing apparatus 100.

Figure 6:
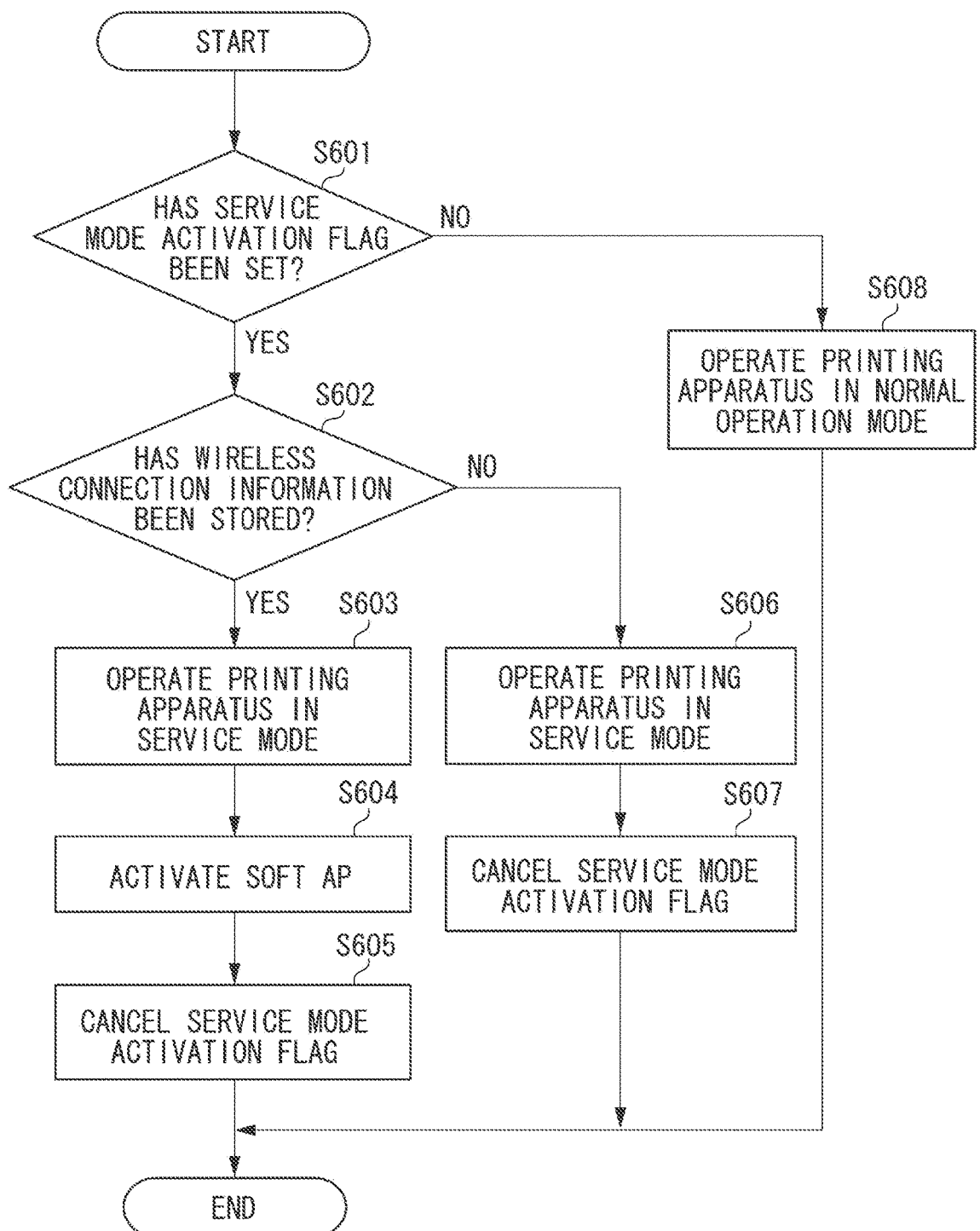
FIG. 6 is a flowchart illustrating processing executed by the printing apparatus.

Next, processing that is executed when the printing apparatus 100 is activated is described with reference to a flowchart illustrated in FIG. 6. Each of steps in the flowchart illustrated in FIG. 6 is executed by the CPU 201. The CPU 201 loads a control program stored in a memory, such as the ROM 202, to the RAM 203, and executes the program for each step. Alternatively, the printing apparatus 100 can be configured such that at least one portion of the steps in the flowchart illustrated in FIG. 6 is executed by the CPU 201, and the rest of the steps is executed by another CPU (not illustrated) different from the CPU 201.

In step S601, the CPU 201 determines whether a service mode activation flag has been set. The CPU 201 refers to a value in the register to make the determination. If the CPU 201 determines that the service mode activation flag has been set in the register (YES in step S601), the operation proceeds to step S602. If the CPU 201 determines that the service mode activation flag has not been set in the register (NO in step S601), the operation proceeds to step S608. In step S608, the CPU 201 causes the printing apparatus 100 to operate in a normal operation mode.

Next, step S602 is described. In step S602, the CPU 201 determines whether wireless connection information is stored in the HDD 204. If the CPU 201 determines that the wireless connection information is stored in the HDD 204 (YES in step S602), the operation proceeds to step S603. In step S603, the CPU 201 causes the printing apparatus 100 to operate in a service mode instead of the normal operation mode. Subsequently, in step S604, the CPU 201 controls the wireless LAN I/F 205 to activate the soft AP. Herein, the wireless connection information generated by the CPU 201 is the wireless connection information stored in the HDD 204, and is the same as that used by the soft AP prior to the reactivation. In step S605, the CPU 201 cancels the service mode activation flag.

Returning to step S602, if the CPU 201 determines that the wireless connection information is not stored in the HDD 204 (NO in step S602), the operation proceeds to step S606. In step S606, the CPU 201 causes the printing apparatus 100 to operate in the service mode instead of the normal operation mode. Subsequently, in step S607, the CPU 201 cancels the service mode activation flag.

The processing executed by the printing apparatus 100 at the time of reactivation has been described with reference to the flowcharts illustrated in FIGS. 5 and 6. When the printing apparatus 100 is reactivated according to the reactivation instruction received from the mobile terminal 110, the printing apparatus 100 operates in the service mode instead of the normal operation mode (step S603 of the flowchart illustrated in FIG. 6). Even when the service engineer does not perform a special operation on the printing apparatus 100, the printing apparatus 100 operates in the service mode subsequent to the reactivation. Hence, the cumbersome task is eased for the service engineer.

When the printing apparatus 100 is reactivated according to the reactivation instruction received from the mobile terminal 110, the printing apparatus 100 activates the soft AP (step S604 of the flowchart illustrated in FIG. 6) by using wireless connection information that is the same as that used prior to the reactivation. From a standpoint of the service engineer, since the mobile terminal 110 is automatically reconnected to the printing apparatus 100 subsequent to the reactivation of the printing apparatus 100, usability is enhanced. Moreover, the printing apparatus 100 uses the same wireless connection information until the stop icon 323 is selected when the printing apparatus 100 is repeatedly reactivated. That is, the printing apparatus 100 uses the same wireless connection information until the service engineer finishes the maintenance work. Therefore, usability for the service engineer is enhanced.

Hereinafter, a second exemplary embodiment is described. The first exemplary embodiment was described using an example configuration in which the wireless connection information used by the soft AP prior to the reactivation of the printing apparatus is used again subsequent to the reactivation. That is, the same wireless connection information is used prior to and subsequent to the reactivation of the printing apparatus. Fixed wireless connection information can be used as wireless connection information to be used in a service mode as a modification example.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-116116, filed Jun. 10, 2016, which is hereby incorporated by reference herein in its entirety.

What is claimed is:

1. A printing apparatus operable in a normal operation mode and a service mode for work performed by a service engineer, the printing apparatus comprising:
   at least one processor to perform the operations of the following units:
   a receiving unit configured to receive a start instruction for starting a direct wireless communication function when the printing apparatus operates in the service mode;
   a wireless communication unit configured to communicate with an external device by using the direct wireless communication function started according to the start instruction received by the receiving unit; and
   a control unit configured to reactivate the printing apparatus when the printing apparatus receives a reactivation instruction from the external device connected to the printing apparatus by the direct wireless communication function,
   wherein the printing apparatus reactivated by the control unit starts an operation in the service mode instead of the normal operation mode and starts the direct wireless communication function without receiving the start instruction for starting the direct wireless communication function.

2. The printing apparatus according to claim 1, wherein the printing apparatus reactivated by the control unit automatically starts the direct wireless communication function using wireless connection information used by the direct wireless communication function prior to reactivation of the printing apparatus.

3. The printing apparatus according to claim 2, wherein the wireless connection information includes at least an SSID.

4. The printing apparatus according to claim 2, wherein the wireless connection information includes an SSID and an authentication key.

5. The printing apparatus according to claim 2, wherein the at least one processor or circuit to perform the operations of the following units:
   a generation unit configured to generate the wireless connection information according to reception of a start instruction by the receiving unit.

6. The printing apparatus according to claim 5, wherein the at least one processor or circuit to perform the operations of the following units:
   a storage unit configured to store the wireless connection information generated by the generation unit in a case where a reactivation instruction is received by the printing apparatus from an external device connected to the printing apparatus by the direct wireless communication function,
   wherein the printing apparatus reactivated by the control unit automatically starts the direct wireless communication function by using the wireless connection information stored in the storage unit.

7. The printing apparatus according to claim 2, wherein the wireless connection information used by the direct wireless communication function is the same before and after the reactivation until a stop instruction for stopping the direct wireless communication function is received.

8. The printing apparatus according to claim 1, wherein the direct wireless communication function causes the printing apparatus to operate as an access point.

9. The printing apparatus according to claim 1, wherein the direct wireless communication function is a Wi-Fi Direct® function.

10. A method for controlling a printing apparatus operable in a normal operation mode and a service mode for work performed by a service engineer, the method comprising:
receiving a start instruction for starting direct wireless communication function when the printing apparatus operates in the service mode;
communicating with an external device by using the direct wireless communication function started according to the received start instruction; and
reactivating the printing apparatus when the printing apparatus receives a reactivation instruction from the external device connected to the printing apparatus by the direct wireless communication function,
wherein the printing apparatus, when reactivated, starts an operation in the service mode instead of the normal operation mode and starts the direct wireless communication function without receiving the start instruction for starting the direct wireless communication function.

11. The printing apparatus according to claim 10, further comprising automatically starting the direct wireless communication function using wireless connection information used by the direct wireless communication function prior to reactivating the printing apparatus.

12. The printing apparatus according to claim 11, wherein the wireless connection information includes at least an SSID.

13. The printing apparatus according to claim 11, wherein the wireless connection information includes an SSID and an authentication key.

14. The printing apparatus according to claim 10, wherein the direct wireless communication function causes the printing apparatus to operate as an access point.

15. The printing apparatus according to claim 10, wherein the direct wireless communication function is a Wi-Fi Direct® function.

16. A computer-readable storage medium storing computer executable instructions method that cause a computer to execute a method for controlling a printing apparatus operable in a normal operation mode and a service mode for work performed by a service engineer, the method comprising:
receiving a start instruction for starting direct wireless communication function when the printing apparatus operates in the service mode;
communicating with an external device by using the direct wireless communication function started according to the received start instruction; and
reactivating the printing apparatus when the printing apparatus receives a reactivation instruction from the external device connected to the printing apparatus by the direct wireless communication function,
wherein the printing apparatus, when reactivated, starts an operation in the service mode instead of the normal operation mode and starts the direct wireless communication function without receiving the start instruction for starting the direct wireless communication function.

* * * * *